Aug. 14, 1962  H. PAAL  3,048,952
MACHINE FOR THE PRODUCTION OF FILLED PACKAGES
Filed Aug. 1, 1960  4 Sheets-Sheet 1

3,048,952
MACHINE FOR THE PRODUCTION OF FILLED PACKAGES
Hans Paal, Waiblingen, Wurttemberg, Germany, assignor to Firma Fr. Hesser Maschinenfabrik-Aktiengesellschaft, Stuttgart-Bad Cannstatt, Germany, a corporation of Germany
Filed Aug. 1, 1960, Ser. No. 46,790
Claims priority, application Germany Aug. 3, 1959
8 Claims. (Cl. 53—184)

The invention is concerned with a machine for producing, filling with contents of all kinds, and closing packages of thermoplastic foil.

In a known machine of this type the package containers are formed, in a deep drawing process, from a web of foil which has been plasticised by warming, and are filled and closed after being transferred to an intermittently indexable conveyor mechanism. All the working operations take place in this machine along one line in a horizontal plane, the individual packages remaining joined together and not being separated from each other until shortly before they leave the machine.

The arrangement of all the treating and filling stations in a line makes the machine, however, comparatively long and calls for a large amount of space. Furthermore the capacity of the machine is reduced because the performance of the operating steps is dependent upon the comparatively long time periods required for the deforming and hardening of the plasticised foil.

In order to obviate these disadvantages, in the machine according to the invention, devices for feeding in and shaping the foil are arranged at the lower run of an endless conveyor mechanism which circulates continuously in a vertical plane and is furnished with die-like clamping frames, and devices for filling, feeding in the package cover, and closing the package are arranged at the upper run of the conveyor mechanism.

This machine arrangement in accordance with the invention permits a high rate of output allied with only a small space requirement.

Figure 1:
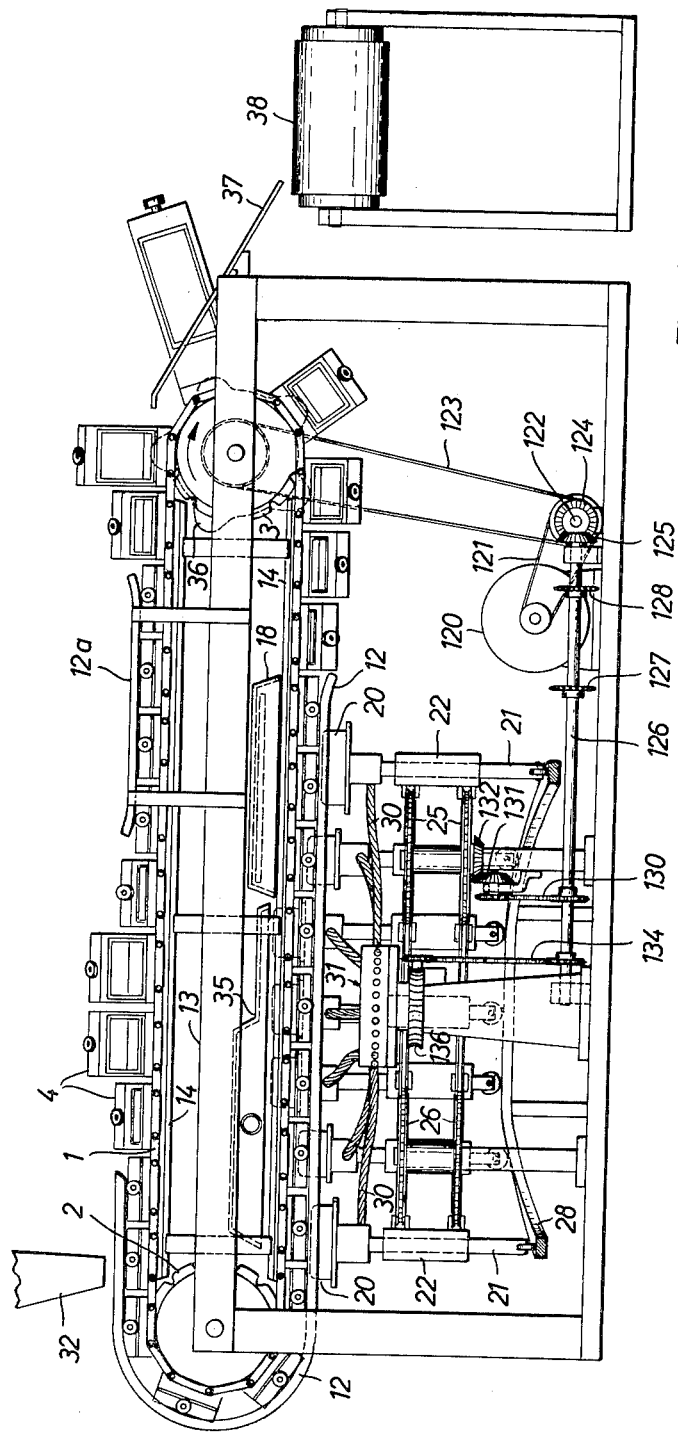
Figure 2:
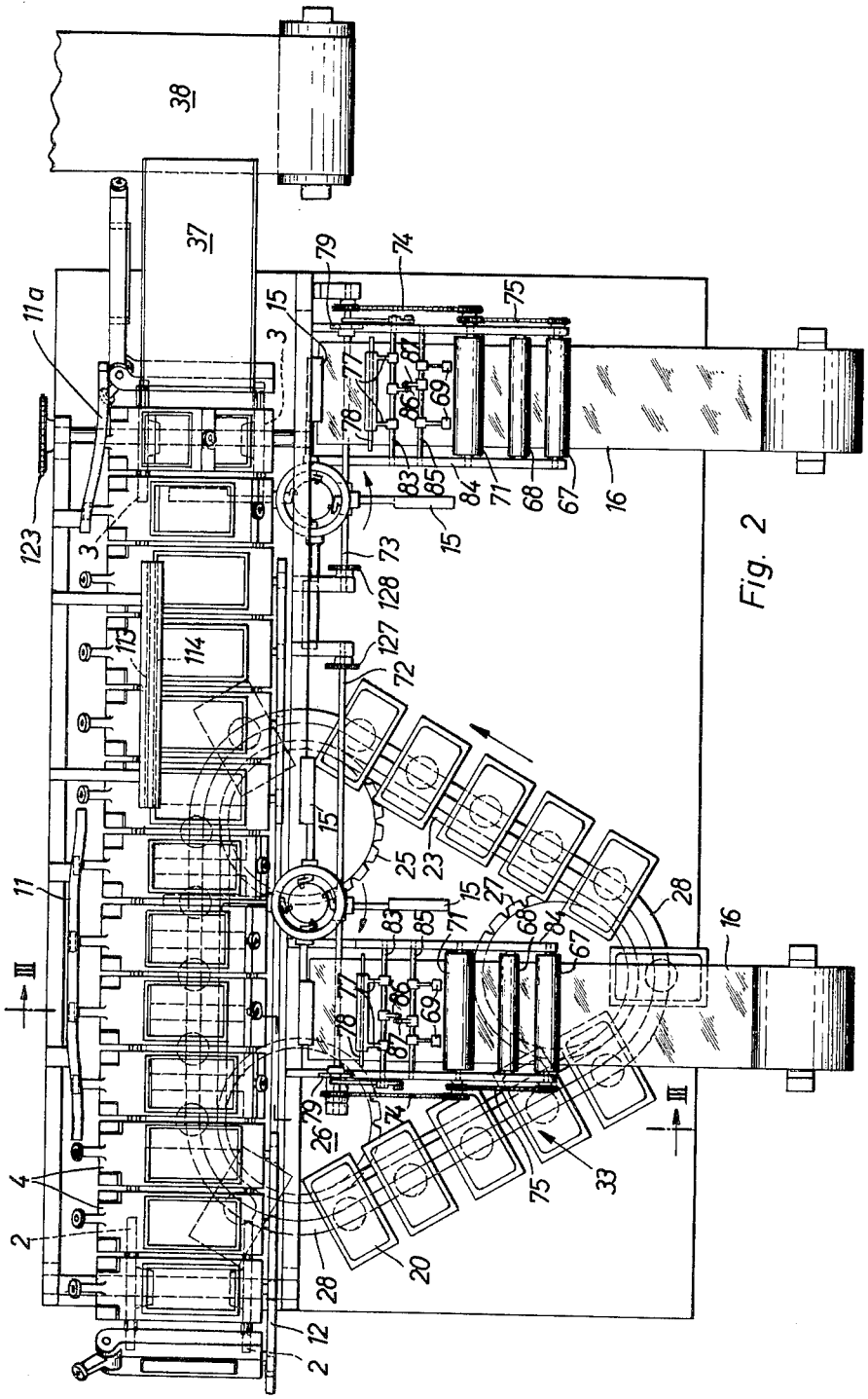
Figure 3:
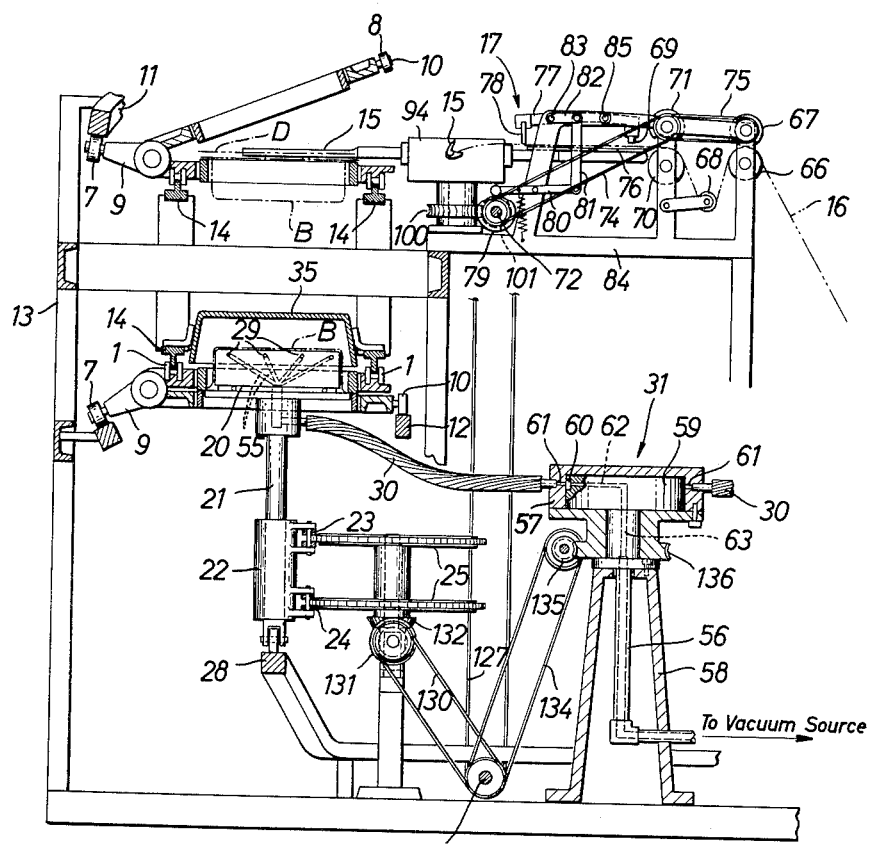
Figure 4:
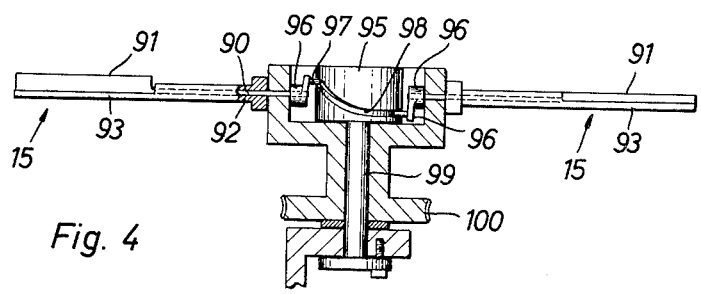
Figure 5:
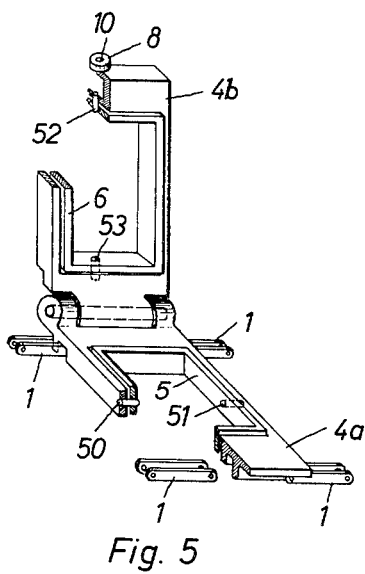
Figure 6:
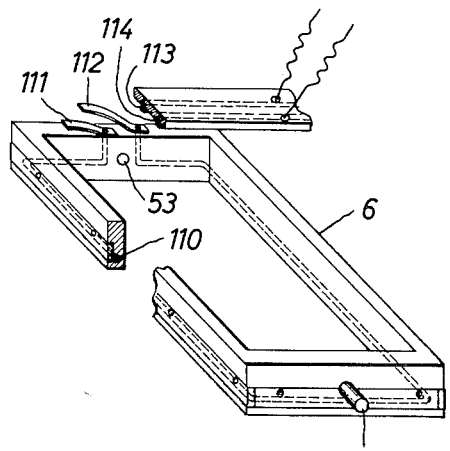
Figure 7:
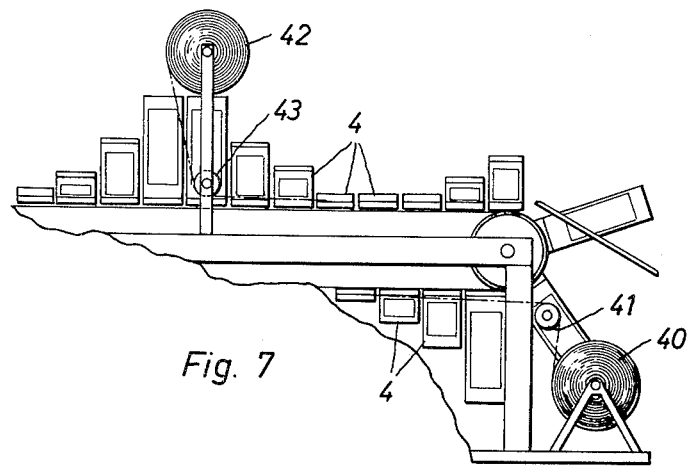

An embodiment of the subject of the invention is illustrated by way of example in the accompanying drawings, in which:

FIGURE 1 shows a side view of a machine equipped in accordance with the invention with the two devices for feeding in the foil for containers and covers omitted, FIGURE 2 shows a plan of the machine according to FIGURE 1, FIGURE 3 shows an enlarged cross section of the machine on the plane III—III of FIGURE 1, FIGURE 4 shows a sectional view of a tong spider for feeding in the foils, FIGURE 5 is a perspective view, partly in section, of a clamping frame in the open position, FIGURE 6 is a perspective view of a format member, partly in section, and FIGURE 7 shows a side elevation of part of another machine equipped according to the present invention for producing filled packages.

The machine illustrated in this case has a pair of conveyor chains 1 which circulate continuously in a vertical plane around reversing wheels 2, 3. Devices for feeding in a thermoplastic, deformable foil, devices for shaping the foil into containers, and devices for filling and closing these containers are arranged along this pair of conveyor chains 1.

The packages are produced in a number of clamping frames 4 which are fastened to both conveyor chains 1 and can be closed together in pincers fashion. One part 4a of each frame is firmly mounted on the conveyor chains 1, whilst another part 4b is pivotably mounted on the first. Interchangeable frame-like format members 5, 6 are inserted in both parts of each clamping frame 4 and clamp between them the infed foil blanks, one of these members also serves as a forming die during the shaping of the foil. Projections 9, 10 provided with rollers 7, 8, are mounted on the pivotable part 4b for opening and closing the clamping frames 4, the rollers 7, 8 running on correspondingly formed guide rails 11, 12.

In order to assure that the foil blanks are gripped with equal pressure around their entire periphery by the format members 5, 6, the latter are cardanically suspended in the clamping frames 4. For this purpose, the format member 5 is mounted in the lower part 4a of the clamping frame 4 so as to be rotatable about an axis which is formed by two journal pins 50, 51 and is arranged normal to the pivot axis of format member 6 in the upper part 4b, which is constituted by journal pins 52, 53.

The foil blanks are fed into the opened clamping frames 4 after the latter have been swung into the lower straight section of the conveyor 1. For this purpose tongs 15 (FIGS. 2 and 4) rotatable in a horizontal plane, is adapted to grip a foil blank which is severed by a cutting device 17 from a web 16 which is fed in transversely to the conveyor chain 1 from a roll. The foil blank is brought between parts 4a and 4b of clamping frame 4 when the parts are in an opened position. Parts 4a and 4b are opened by the cooperation of roller 7 which is integral with part 4b and which rides in a guide rail 11a. When the tongs 15 position the foil blank above part 4b of the clamping frame, the tongs are opened whereby the foil blank is deposited on the clamping frame. Part 4b is then pressed against the insert blank and part 4a during continuous advancement of the frame 4, and clamping is effected as roller 8, which is integral with part 4b, moves along guide rail 12. During this clamping operation, the clamping frames 4 are supported on their conveyor chains 1 by supporting rails 14 mounted on the front of the machine frame 13.

During this conveyance the foil blanks clamped in the clamping frames 4 are first heated by a commercially available type of radiant heater 18 (FIGURE 1) to a temperature suitable for plastic working, and then deep drawn by mechanical means. For this purpose forming plungers 20 are provided to bulge out the plasticised foil from below and shape it into containers B, the clamping frames 4 serving as dies and the margins of the containers B being firmly held between the shaping members 5, 6. The forming plungers 20, which are of the same shape as the containers B to be produced, are secured to rods 21 which are mounted in sleeves 22 for axial movement. The sleeves 22 are, on the one hand, fastened at regular distances to two conveyor chains 23, 24, which are continuously circulating around three pairs of reversing wheels 25, 26, 27 at the same speed as the clamping frames 4. The pairs of reversing wheels 25, 26, 27 are, see FIGURE 2, arranged to form an isosceles triangle and are associated with the chains 1 in such a way that the forming plungers 20 register with the clamping frames 4, which move with the conveyor chains 1, over a specific section of the path of travel. The shaping of the containers B takes place along this section of travel by the rods 21, the forming plungers 20 being lifted by a rail 28 of increased height along this section, and being lowered again after this.

To assist the shaping of the containers B by each forming plunger 20, suction openings 29 are provided in the latter and are connected through channels 55 in this die and tubes 30 to a centrally arranged distributor head 31 and a suction line 56. The suction air to these suction openings 29 is so controlled that, after being mechanically deformed, a foil blank bears intimately against a forming plunger 20. For this purpose the distributor head 31 comprises a casing 57 which rotates continuously in accordance with the forming plungers 20 and is connected with the latter by bores 61 and tubes 30, and a distributor head 59 mounted on a supporting bracket 58 and presenting on its circular periphery in the section facing towards the clamping frame 4, a control port 60 with which the bores 61 of casing 57 come into register. The control port 60 is connected with the suction line 56 by a radial bore 62 and a central axial bore 63.

In order to speed up the hardening of the foil after shaping, a hood 35 (FIGURE 1) is provided above the common path of movement of the clamping frames 4 and forming plungers 20, the warm air being drawn off or cool air being admitted through the hood.

After the containers B have passed through the final reversing section defined by the reversing wheels 2, they are still clamped in the clamping frames 4 and are filled either by means of an automatically operating filling device 32 or by hand.

To apply covers D to the container openings, the upper parts 4b of the clamping frames 4 are opened by means of the rail 11, and the container covers D are fed in the form of foil blanks (see FIGURE 3) by means of a device 33 which is of a construction mirror-symmetrical to that described above which feeds in the foil blanks for the containers B. The foil material for containers and covers is each drawn from a supply roll 65 by means of a pair of continuously rotating feed rollers 66, 67, and over a swinging roller 68 is fed to a pair of format rollers 70, 71 which in co-operation with retainers 69 intermittently feed the web 16 to the cutting device 17. The pair of format rollers comprises a lower roller 70 of circular cross section and an upper roller 71 which presents a segment-shaped recess, so that there is no feeding movement of the web 16 while this recess of roller 71 rotates past the lower roller 70. The roller pairs 66, 67 and 70, 71 are each driven from a control shaft 72, respectively 73, through the intermediary of chain gearing 74, respectively 75.

Each time after the web 16 has been advanced by a predetermined length, a blank is cut off therefrom by means of the cutting device 17, whilst the web 16 is at the same time pressed down on the feeding table 76 by the retainers 69. For this purpose, a cam 79 fastened on the control shaft 72 (73) jointly controls, through the intermediary of levers 80, 81, 82, the cutting device comprising a knife 78 mounted on levers 77 and the front edge of the feeding table 76 which forms a cutting edge, and the retainers 69. The lever 82 is mounted on a shaft 83 which is supported in the frame 84 of the feeding device and carries the levers 77 of knife 78. The shaft 83 is further connected, through levers 86, 87, with a shaft 85 carrying the retainers 69.

The severed blanks are then gripped by the continuously rotating tongs 15 and fed into the clamping frames 4. The tongs 15 which comprises a hinged part 91 mounted on a rotatably supported shaft 90, and a part 93 rigidly connected with a drum 94 through the intermediary of a hollow shaft 92, are controlled by a cylindrical cam 95 centrally arranged in the drum 94, in such a manner that during their rotation they grip the blanks and release them again after a 90° feeding movement. For this purpose, levers 96 are fixed on the shafts 90 of the movable hinged tong parts 91, said levers 96 each being guided by means of a pin 97 in a groove 98 of the cylindrical cam 95 (see FIGURE 4). The drum 94 is supported on a vertical shaft 99 carrying the cylindrical cam 95 and comprises a worm gear 100 which for the purpose of imparting movement of the tongs 15 is driven by a worm 101 secured on the worm shaft 72 (73). The foils for the containers B and covers C may also be fed into the machine in the form of a continuous web which is advanced in the direction of travel of the conveyor chain 1 and is carried along by the clamping frames 4. This manner of feeding the foil is illustrated in FIGURE 7. The foil web for the containers B is unrolled from a roll 40 and over a reversing roller 41 passes directly between the two parts 4a and 4b of the clamping frames 4, the part 4b being in each case swung away from the part 4a by an angle of 90°. Feeding of the cover foil is accomplished in a similar manner from a roll 42 over a reversing roller 43. After the cover foils D have been placed on the filled containers B, the clamping frames 4 by means of their format members 5, 6 press the marginal portions of cover and container upon one another and weld them together. This is done in the zone of the guide rail 12a which, while the clamping frames 4 travel past it, applies to them a certain clamping pressure. For welding the marginal portions together, electric heating means in the form of heating wires 110 are provided in the format inserts 5 (FIG. 6), said heating means heating the format members 5 in the aforementioned zone, so that under the influence of pressure and heat the marginal portions of container and cover are welded together. The two ends of the heating wires 110 are connected to sliding contacts 111, 112 which during the travel of the clamping frames 4 make contact with electric power supply bars 113, 114.

After the containers B have been closed and the clamping frames 4 opened, the finished packages are lifted out of the clamping frames 4 by a cam-provided wheel 36 (FIGURE 1), which rotates with the reversing wheels 3, and then travels to a discharge conveyor belt 38 over a chute 37. The entire machine is driven by an electric motor 120 which through belt gearing 121 drives a shaft 122. This shaft, on the one hand, drives through chain gearing 123 the sprockets 3 for the conveyor chains 1, and on the other hand drives through bevel gearing 124, 125 a shaft 126. This shaft 126 in turn drives through chain gearing 127, 128 the control shaft 72, 73 of the foil feeding device, while through further chain gearing 130 and bevel gearing 131, 132 it drives the pair of sprockets 25 for the chains 23, 24 of the forming plungers, and finally this shaft 126 also drives, through chain gearing 134 and worm gearing 135, 136, the distributor head 31.

What I claim is:

1. A machine for producing a filled closed package from a blank, the machine comprising endless conveyor means, means coupled to the conveyor means for moving the same along a path having spaced runs, clamping frames supported on said conveyor means for being moved therewith, means operatively associated with said endless conveyor means for feeding a blank to the clamping frames along one of said runs, further conveyor means extending parallel and coextensive with at least part of said one run of the path of the first said conveyor means, means on said further conveyor means for cooperating with said clamping frames with the further conveyor means coextensive with said one run to form the blank in dish shape, means operatively positioned relative to the other run of said path to fill the formed blank as the latter traverses said other run, means positioned adjacent the other run of the path and operatively associated with said conveyor means for feeding a cover to said clamping frames for the filled blank, means adjacent the latter said means for cooperating with said clamping frames to effect sealing of the cover to the blank to form a filled, closed package and means operatively positioned relative to said clamping frames for removing the package from the clamping frames to complete a cycle of operation.

2. A machine for producing a filled closed package from a blank, the machine comprising endless conveyor means, means coupled to the conveyor means for moving the same along a path having spaced parallel runs positioned in a vertical plane so that said runs constitute upper and lower runs, clamping frames supported on said conveyor means for being moved therewith, means operatively associated with said conveyor means for feeding a blank to the clamping frames at the beginning of the lower run, further conveyor means extending parallel and coextensive at least in part with the lower run of the conveyor means, means on said further conveyor means for cooperating with said clamping frames with the further conveyor means coextensive with said lower run to deform the blank into desired shape, means operatively positioned relative to the upper run to fill the deformed blank as the latter traverses said upper run, means poistioned adjacent the upper run and operatively associated with the clamping frames for feeding a cover thereto for the filled blank, means adjacent the latter said means for cooperating with said clamping frames to effect sealing of the cover to the filled blank to form a filled closed package and means between the last said means and the means for feeding a blank and operatively positioned relative to said clamping frames for removing the package therefrom to complete a cycle of operation.

3. A machine as claimed in claim 2 wherein said further conveying means defines a path of triangular extent, the latter said path including a side which extends beneath said one first said run.

4. A machine as claimed in claim 2 wherein the means for feeding said blank to the clamping frames comprises continuously rotating tongs for selectively gripping said blank to convey the same to said clamping frames.

5. A machine as claimed in claim 2 wherein the means to deform said blank includes a forming plunger, said plunger being provided with openings, said plunger being adapted for connection with a suction source whereby said openings are subjected to suction.

6. A machine as claimed in claim 2 wherein each of said clamping frames comprises a first part rigidly connected to the conveyor means and a second part pivotably supported on said first part, said machine further comprising means operatively positioned relative to said conveyor means for engaging said clamping frame to selectively pivot said second part with respect to the said first part.

7. A machine as claimed in claim 6 comprising a detachable format member in each of said parts, said format members having an opening therein for permitting penetration by said forming plunger.

8. A machine as claimed in claim 7 comprising a heating wire in one of said format members, adapted for being selectively connectable with a source of electromotive force for heat sealing said blank and said cover.

References Cited in the file of this patent

UNITED STATES PATENTS

| | | |
|---|---|---|
| 1,481,866 | Heist | Jan. 29, 1924 |
| 2,210,509 | Strauch | Aug. 6, 1940 |
| 2,497,212 | Donofrio | Feb. 14, 1950 |
| 2,712,717 | Keller | July 12, 1955 |
| 2,927,409 | Heyer | Mar. 8, 1960 |
| 2,928,221 | Smith | Mar. 15, 1960 |
| 2,949,373 | Kraft et al. | Aug. 16, 1960 |

FOREIGN PATENTS

| | | |
|---|---|---|
| 734,752 | Great Britain | Aug. 10, 1955 |